(12) United States Patent
Hanes et al.

(10) Patent No.: US 6,810,432 B1
(45) Date of Patent: Oct. 26, 2004

(54) METHOD FOR GUARANTEEING A DEVICE MINIMUN BANDWIDTH ON A USB BUS

(75) Inventors: David H Hanes, Loveland, CO (US);
John M Main, Fort Collins, CO (US);
Stephen F Bayless, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/542,405

(22) Filed: Apr. 3, 2000

(51) Int. Cl.$^7$ ................................................ G06F 13/00
(52) U.S. Cl. ................................ 710/4; 710/8; 710/15; 710/20; 710/29; 710/33; 710/36; 710/48; 710/60; 710/107; 710/313
(58) Field of Search ............................ 710/4, 8, 15, 20, 710/29, 33, 36, 48, 60, 107, 313

(56) References Cited

U.S. PATENT DOCUMENTS

| | | | | |
|---|---|---|---|---|
| 5,488,694 A | * | 1/1996 | McKee et al. | 710/4 |
| 6,061,746 A | * | 5/2000 | Stanley et al. | 710/10 |
| 6,078,976 A | * | 6/2000 | Obayashi | 710/128 |

OTHER PUBLICATIONS

Edward D. Dekker, et al.; "Developing Windows NT Device Drivers: A Programmer's Handbook," (1999), by Addison Wesley Longman, Inc., ISBN 0-201-69590-1. Chapter 29 I/O Hardware: The Universal Ser. Bus, p. 683–738, Chapter 30 The Win32 Driver Model, pp. 739–777.

Universal Ser. Bus Specification, (1998), Compaq Computer Corp., Intel Corp., Microsoft Corp., NEC Corp., Revision 1.1 Sep. 23, 1998, pp. i–xvi, pp. 1–311.

* cited by examiner

Primary Examiner—Jeffrey Gaffin
Assistant Examiner—Mohammad O. Farooq
(74) Attorney, Agent, or Firm—Alexander J. Neudeck

(57) ABSTRACT

A method of guaranteeing a minimum sustained data transfer rate to a chosen device connected to a USB bus. A set of filter drivers are inserted in the driver stacks for at least two USB devices. These filter drivers are controlled by a filter driver controller that provides and receives information from the filter drivers. When a particular device needs a minimum sustained bandwidth for a transaction, the filter driver for that device notifies the filter driver controller. The filter driver controller then instructs the filter drivers for at least one other device to start interfering with USB transactions. This interference prevents the interfered with devices from using any of the USB bus bandwidth thereby providing a minimum sustained bandwidth to the non-interfered with device.

4 Claims, 3 Drawing Sheets

METHOD FOR GUARANTEEING A DEVICE MINIMUN BANDWIDTH ON A USB BUS

FIELD OF THE INVENTION

This invention relates generally to the Universal Serial Bus (USB) and more particularly to ensuring that a minimum amount of bandwidth is allocated to a particular device.

BACKGROUND OF THE INVENTION

The Universal Serial Bus (USB) is a peripheral bus specification developed by personal computer (PC) and telecommunication industry companies that brings the plug and play features of computer peripherals outside the PC box. This eliminates the need to install cards into dedicated computer slots and reconfigure the system. Personal computers equipped with USB allow computer peripherals to be automatically configured as soon as they are physically attached. This eliminates the need to reboot or run setup software. USB also allows multiple devices to run simultaneously on a computer, with dedicated hubs and peripherals such as monitors and keyboards also acting as additional plug-in sites.

The Universal Serial Bus is defined in the Universal Serial Bus Specification, revision 1.1, Sep. 23, 1998 which is hereby incorporated herein by reference. This document is available from the USB Implementers Forum web page at http://www.usb.org. Also under development is USB 2.0 which is intended to be fully compatible with USB 1.1 and extend performance by up to 40 times over existing capabilities and use the same cables and connectors.

USB is implemented as a "shared" bus. In other words, there can be multiple active devices connected to the USB bus with each active device getting a portion of the total available USB bandwidth. Unfortunately, this characteristic can cause problems with some types of devices. For example, a writeable compact disc drive, such as a CD-R or CD-RW drive, may use disc-at-once or track-at-once recording modes. In a disc-at-once recording mode, recording never stops until the entire disc has been created. In track-at-once, recording only stops at track boundaries. The limited availability of stopping times during recording can cause a problem called "buffer underrun." A buffer underrun occurs when the host computer or bus cannot supply data to the drive at a rate at least equal to the speed that the drive is writing data to the media. To illustrate, if a drive capable of "4X" write speed, it can write data to the media at 600 kilobytes per second (KB/sec). Therefore, the host computer, and the bus connecting the computer to the drive, must be able to sustain a 600 KB/sec data transfer rate to the drive or the drive would require a data buffer that is too large to be practical. If the host computer and bus cannot sustain a 600 KB/sec data transfer rate, then the drive may run out of data when it is not a valid stopping point. This will cause an error to occur and may ruin the media being written.

When drives or other devices with these type of limitations are connected to a USB bus, they may be writing some media in one of the modes discussed above. If the user begins using another device on the USB bus, the bandwidth available for the drive is reduced. If this reduction in bandwidth is large enough, the bandwidth allocated to the drive may not be enough to maintain the necessary sustained data transfer rate to the drive and a buffer underrun error may occur.

Accordingly, there is a need in the art for a method and apparatus that guarantees a minimum data transfer rate across a USB bus to and from certain devices. It is desirable that such method and apparatus be easy to implement from a user's point of view. It is also desirable that such method and apparatus work with devices that conform to the USB device specifications so that existing and future devices and existing and future USB busses do not need to be redesigned or altered.

SUMMARY OF THE INVENTION

In a preferred embodiment, the invention provides a minimum sustained data transfer rate to a chosen device connected to a USB bus. A set of filter drivers are inserted in the driver stacks for at least two USB devices. These filter drivers are controlled by a filter driver controller that provides and receives information from the filter drivers. When a particular device needs a minimum sustained bandwidth for a transaction, the filter driver for that device notifies the filter driver controller. The filter driver controller then instructs the filter drivers for at least one other device to start interfering with USB transactions. This interference may be to temporarily delay one or more transactions to one or more of the other devices until more bandwidth is available. This interference may also take the form of intercepting transactions from one or more of the other devices and returning an error condition. This interference may also be implemented by signaling the host computer that one or more of the other devices is disconnected from the USB bus. Then when the non-interfered with device no longer needs the minimum sustained data rate, the host computer is signaled that the device has been reconnected. This interference prevents the interfered with devices from using any of the USB bus bandwidth thereby providing a minimum sustained bandwidth to the non-interfered with device. Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENTS

Figure 1:
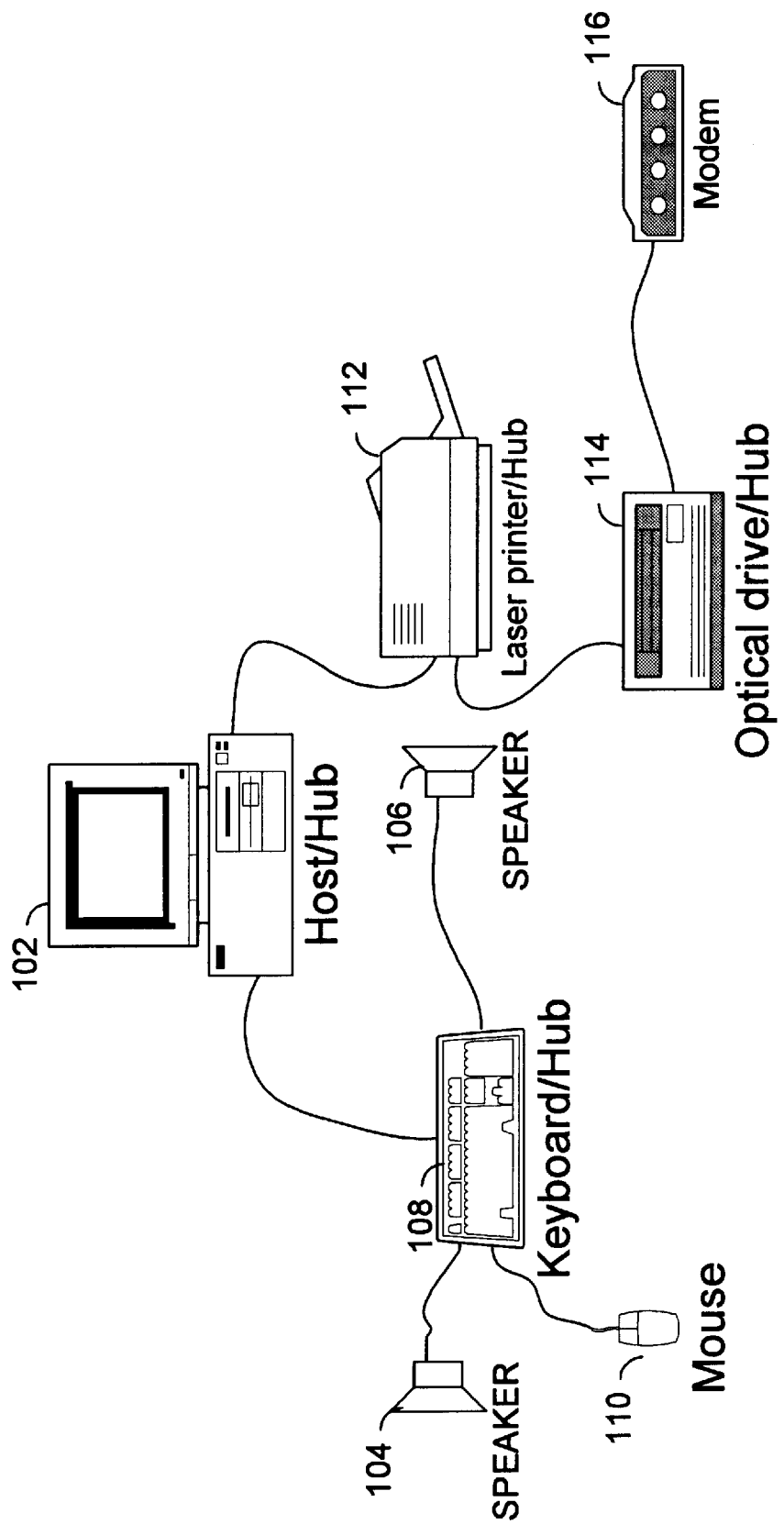
FIG. 1 is an illustration of devices connected to a USB bus including a device that may need guaranteed minimum bandwidth.

FIG. 1 is an illustration of devices connected to a USB bus including a device that may need guaranteed minimum bandwidth. Computer 102 acts as the USB host and also as a hub. A first USB port of computer 102 is connected to keyboard/hub 108. Keyboard/hub 108 has USB hub functionality so multiple USB devices are connected to the ports of keyboard/hub 108. The devices connected to the USB ports on keyboard/hub 108 are speaker 104, speaker 106, and mouse 110. A second USB port of computer 102 is connected to laser printer/hub device 112. Optical drive/hub device 114 is connected to a USB port on laser printer/hub device 112. Finally, a modem 116 is connected to a USB port on optical drive/hub device 114.

As discussed above, one of these devices may need a guaranteed minimum bandwidth to function properly. For example, optical drive/hub 114 may be performing a discat-once write operation. If this is the case, and optical drive/hub 114 writes at 600 KB/sec, it will need at least that amount of bandwidth on the USB bus to avoid buffer underrun. To guarantee this minimum amount of bandwidth, filter drivers are inserted into the USB driver stacks running on computer 102. These filter drivers are controlled by a filter controller that provides and receives information from the filter drivers.

Figure 2:
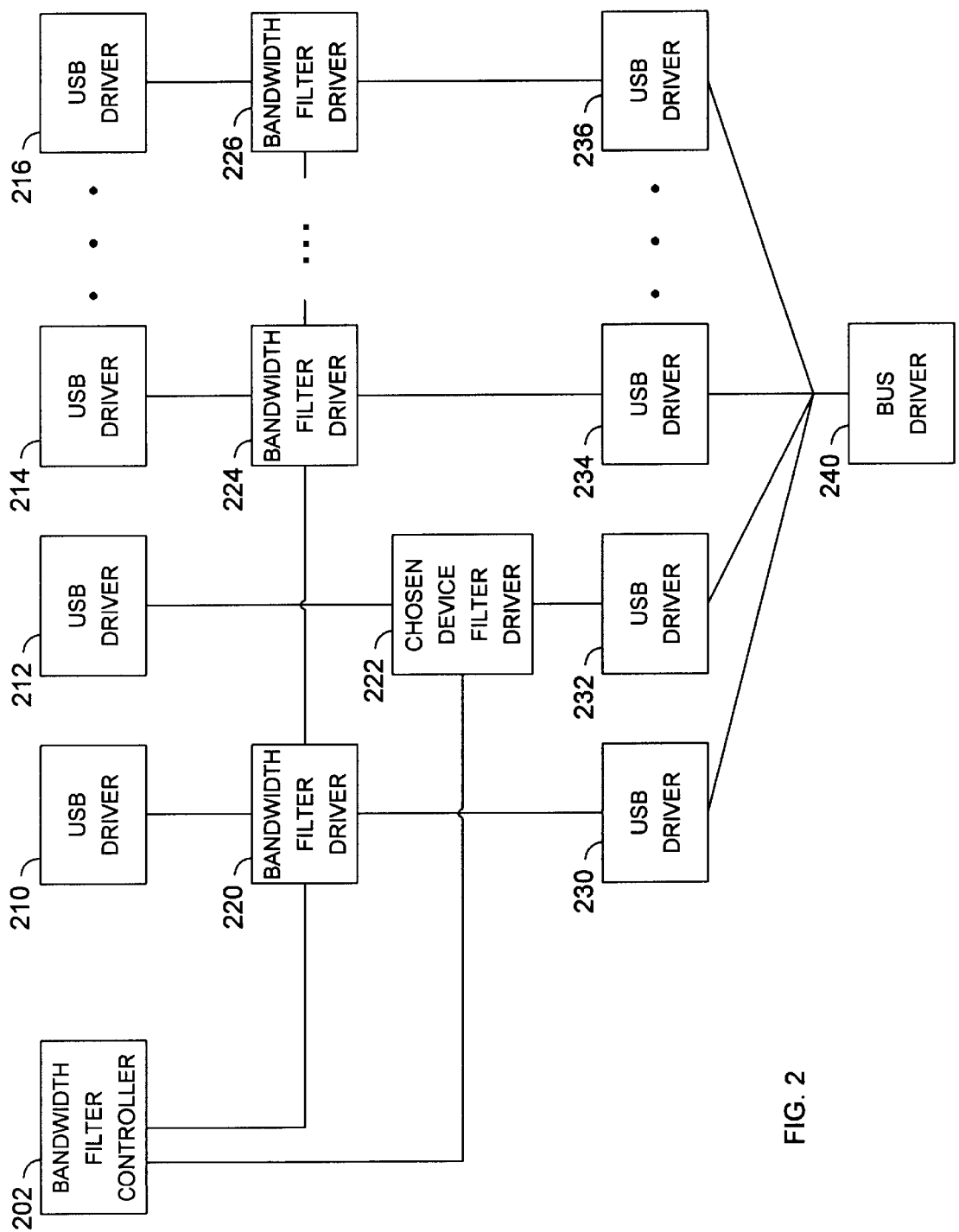
FIG. 2 is an illustration of a set of USB driver stacks that guarantee minimum bandwidth to a chosen device.

FIG. 2 is an illustration of a set of USB driver stacks that guarantee minimum bandwidth to a chosen device. There is a USB driver stack corresponding to each device that is connected to the USB bus. The first driver stack shown comprises USB driver 210, bandwidth filter driver 220, and USB driver 230. USB driver 210 communicates with bandwidth filter driver 220. Bandwidth filter driver 220 also communicates with USB driver 230. USB driver 230 also communicates with bus driver 240. Information on how to construct a filter driver is given in chapter 30 of *Developing Windows NT Device Drivers: a programmer's handbook* by Edward N. Dekker, Addison Wesley Longman, Inc., copyright 1999, which is hereby incorporated herein by reference. This book also contains useful information on the operation of USB and other device drivers. In particular, chapter 29 relates to the Universal Serial Bus and is therefore hereby incorporated herein by reference.

The second driver stack is the driver stack corresponding to the device that needs a minimum amount of bandwidth. In the case discussed above, this would be the driver stack that is associated with optical drive/hub 114. The second driver stack shown comprises USB driver 212, chosen-device filter driver 222, and USB driver 232. USB driver 212 communicates with chosen device filter driver 222. Chosen device filter driver 222 also communicates with USB driver 232. USB driver 232 also communicates with bus driver 240. The third driver stack shown comprises USB driver 214, bandwidth filter driver 224, and USB driver 234. USB driver 214 communicates with bandwidth filter driver 224. Bandwidth filter driver 224 also communicates with USB driver 234. USB driver 234 also communicates with bus driver 240. The fourth driver stack shown comprises USB driver 216, bandwidth filter driver 226, and USB driver 236. USB driver 216 communicates with bandwidth filter driver 226. Bandwidth filter driver 226 also communicates with USB driver 236. USB driver 236 also communicates with bus driver 240.

Bandwidth filter drivers 220, 224, and 226 all communicate with and are controlled by bandwidth filter controller 202. Bandwidth filter controller 202 also communicates with and controls chosen device filter controller 222.

Figure 3:
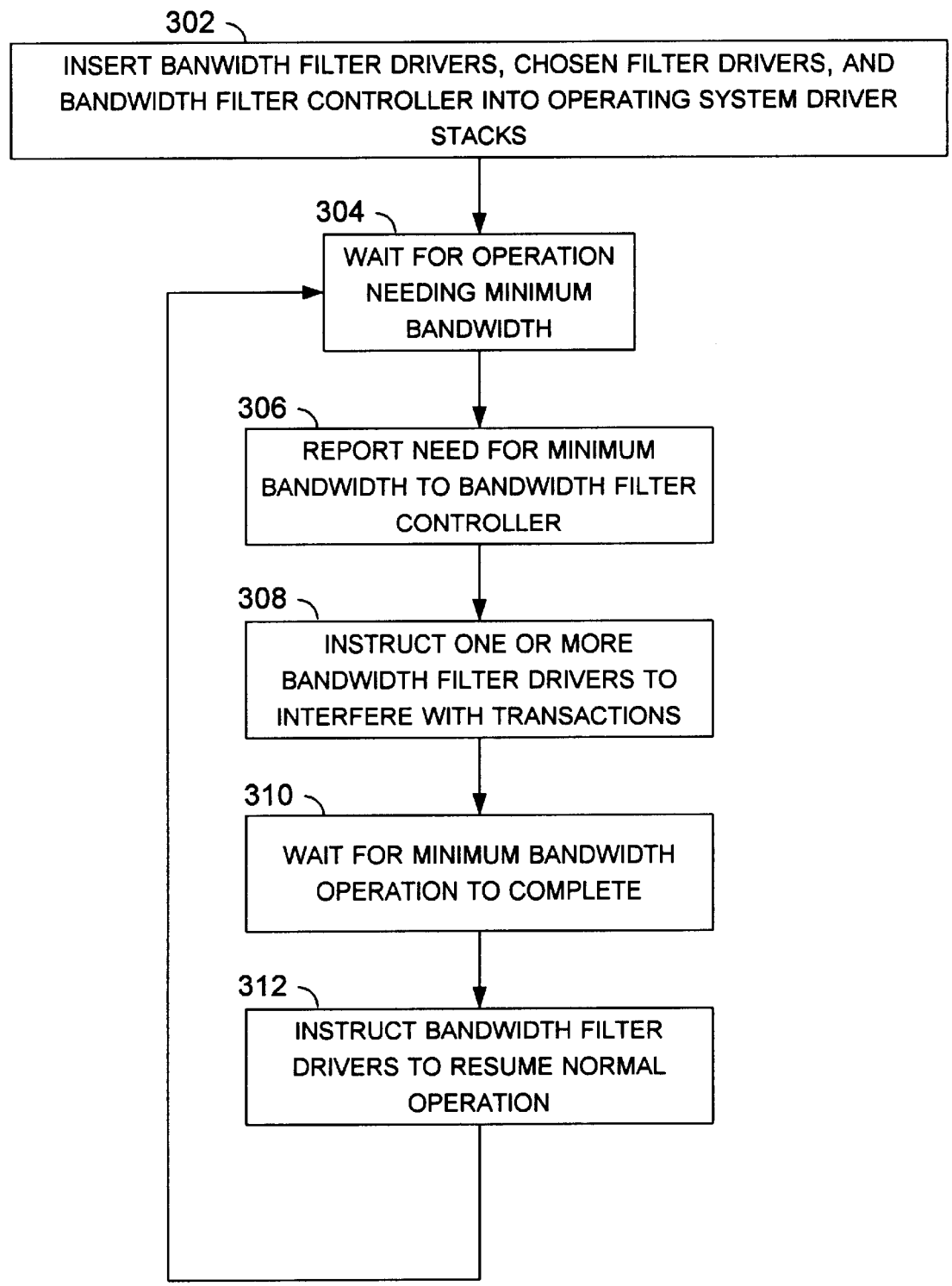
FIG. 3 is a flowchart illustrating steps taken to guarantee minimum bandwidth to a chosen device.

FIG. 3 is a flowchart illustrating steps taken to guarantee minimum bandwidth to a chosen device. In a step 302, the system is initialized by inserting bandwidth filter drivers, a chosen device filter driver or drivers, and a bandwidth filter controller into the operating system driver stacks. After this initialization, in a step 304, all the filter drivers and the filter driver controller wait for an operation requiring minimum bandwidth. While they wait, the filter drivers operate normally and communicate with the other USB drivers without interfering with the flow of communications between these drivers. When an operation is requested that needs minimum bandwidth, a chosen device filter driver controller reports that need to the bandwidth filter controller in a step 306. Alternatively, the bandwidth filter controller could determine itself that a minimum sustained bandwidth is required and notifies the filter drivers. Another alternative is that an application program, such as a CD mastering application, determines that a minimum sustained bandwidth is needed and the application program reports that need to the bandwidth filter controller directly for relay to the filter drivers. In a step 308, after receiving this report, the bandwidth filter controller instructs one or more bandwidth filter drivers to interfere with transactions. This interference prevents at least some bus traffic from actually reaching the USB bus. By reducing this traffic, it guarantees that a minimum bandwidth is available for the chosen device. The number of devices that would have their transactions reduced, or blocked, would depend upon how much bandwidth the various devices are using.

One embodiment of the present invention guarantees minimum bandwidth for the chosen device by interfering with a predetermined set of the other devices on the USB bus. For example, all of the devices except for the keyboard and mouse may be interfered with. This would guarantee most of the available bandwidth to the chosen device because keyboards and mice generally do not use much bandwidth and it is desirable that the devices continue to function at all times. In one embodiment, the interference takes the form of reporting back to the system that a device has been disconnected from the bus. This "virtual disconnection" takes place only in the driver stacks and is accomplished by the bandwidth filter controllers reporting a disconnect condition even though one does not actually exist. Since the higher level USB drivers and the system then believe that the device is no longer present, they will stop trying to send information to that device across the USB bus.

Other forms of interference that may be used are to temporarily delay one or more transactions to one or more of the other devices until more bandwidth is available. Another form of interference that may be used takes the form of intercepting transactions from one or more of the other devices and returning an error condition.

In a step 310, the bandwidth filter controllers continue to interfere with USB transactions until the minimum bandwidth operation is complete. During this waiting period, the chosen device filter controller continues to pass transactions between USB drivers in a normal manner. This allows the chosen device to use all of the available bandwidth on the USB bus.

In a step 312, after the minimum bandwidth operation has completed, the bandwidth filter driver controller instructs the bandwidth filter drivers to resume normal operation. In the embodiment discussed above, the bandwidth filter drivers would then signal the system that the devices are reconnected and need to be reset. The system would then take appropriate action to restore these devices to normal operation. After this step, the system would return to step 304 and wait for another operation that requires minimum bandwidth.

From the foregoing it will be appreciated that the invention provides a novel and advantageous way of guaranteeing minimum bandwidth on a USB bus. This system may be configured to provide some bandwidth to mission critical devices if there is bandwidth to spare, or may use a dynamic approach that only interferes with devices that are using too much bandwidth, either alone or in combination, to coexist with the minimum bandwidth operation. Finally, this invention may be implemented entirely in software and can be made transparent to both the operating system and the other device drivers.

Although several specific embodiments of the invention have been described and illustrated, the invention is not to be limited to the specific forms or arrangements of parts so described and illustrated. The invention is limited only by the claims.

What is claimed is:

1. An apparatus for providing a minimum sustained data rate across a USB bus, comprising:

a bandwidth filter driver; and, a chosen device bandwidth filter driver, wherein said chosen device bandwidth filter causes said bandwidth filter driver to interfere with transactions intended for a device associated with said bandwidth filter driver, the interference reducing the bus traffic associated with said device.

2. The apparatus of claim 1 wherein said bandwidth filter driver signals that said device associated with said bandwidth filter driver is not connected to said USB bus.

3. The apparatus of claim 1 wherein said bandwidth filter driver delays said transactions intended for said device associated with said bandwidth filter driver.

4. The apparatus of claim 1 wherein said bandwidth filter driver signals an error condition exists on said device associated with said bandwidth filter driver.

* * * * *